United States Patent [19]
Boulware

[11] Patent Number: 5,602,638
[45] Date of Patent: Feb. 11, 1997

[54] APPARATUS FOR ACCURATELY DETERMINING A MOVING BALL'S POSITION AND SPEED

[76] Inventor: Jim L. Boulware, 1960 W. Tarrant Rd., #1005, Grand Prairie, Tex. 75050

[21] Appl. No.: 221,668

[22] Filed: Apr. 1, 1994

[51] Int. Cl.[6] .............................. G01P 3/36; A63B 69/40; F41J 5/02
[52] U.S. Cl. .......................... 356/28; 250/206.1; 273/371; 473/455
[58] Field of Search ......................... 356/28; 250/214 B, 250/206.1; 273/26 A, 371

[56] References Cited

U.S. PATENT DOCUMENTS

| | | | |
|---|---|---|---|
| 3,727,069 | 4/1973 | Crittenden et al. | 250/222 R |
| 4,814,986 | 3/1989 | Spielman | 273/29 A |
| 4,949,972 | 8/1990 | Goodwin et al. | 273/371 |
| 5,230,505 | 7/1993 | Paquet et al. | 273/26 A |
| 5,404,008 | 4/1995 | Malinowski et al. | 250/214 B |

*Primary Examiner*—Stephen C. Buczinski
*Attorney, Agent, or Firm*—John E. Vandigriff

[57] ABSTRACT

The invention is to an apparatus and method for determining the position and speed of a pitched ball. A collection box includes arrays of pulsed infrared emitter sensor pairs. As a ball passes between the emitter/sensor pairs, the signal between at least two emitter/sensor pairs are interrupted. The position of the interrupted emitter/sensor pairs and the time the signal between an emitter/sensor pair indicates the position and speed of the pitched ball.

17 Claims, 5 Drawing Sheets

APPARATUS FOR ACCURATELY DETERMINING A MOVING BALL'S POSITION AND SPEED

FIELD OF THE INVENTION

This invention relates to an apparatus for training ball players, and more particularly to an apparatus for determining accurately the position or positions and speed of a ball as it passes through an array of infrared emitter/sensor pairs.

BACKGROUND OF THE INVENTION

Classically there are considered to be three components of effective pitching (a) the speed of the ball, (b) the location of the pitch as it travels over the plate and (c) movement of the ball from it's natural path of travel. The radar gun attempts to provide only one of these, (a) above, and is not considered extremely accurate. Several approaches have been tried using a matrix and/or planes of light beams to measure both speed, (a) above, and position, (b) above, but each has limitations, solved by the approach described here.

U.S. Pat. No. 3,229,975, issued January 1966, used a matrix of horizontal and vertical light beams in an attempt to measure the position and speed of a ball and display same. No attempt was made to shield ambient light interference and isolation between the beams were not indicated.

U.S. Pat. No. 4,563,005, issued January 1986, describes a method of scanning an array of emitters and coordinating the timing with signals received by four high frequency receivers, spaced at the corners, to form a plane. Two of these planes are described as separated in an attempt to measure speed between planes. No claim was made to avoid external interference from ambient sources.

U.S. Pat. No. 5,230,505, issued July 1993, describes using two planes of sensors which are sourced by continuously radiating infrared emitters and provides a formula of measured times to calculate speed. The claims state the inter-sensor spacing as approximately 2 inches which allows for a position tolerance in excess of 1 inch. This variation in position will also induce an error into the speed calculation. Further, the method of reducing ambient light is to enclose the complete apparatus, greatly reducing its portability and usefulness.

Other patents which may be relevant to the invention are:

U.S. Pat. No. 3,727,069 April 1973 Crittenden, Jr. et al.
U.S. Pat. No. 3,814,438 June 1974 Baron et al.
U.S. Pat. No. 4,770,527 September 1988 Park
U.S. Pat. No. 4,949,972 August 1990 Goodwin et al.
U.S. Pat. No. 4,972,171 November 1990 Johnson et al.

SUMMARY OF THE INVENTION

This invention is for determining accurately the position and speed of a ball as it passes through arrays, matrix or matrixes of infrared emitter/sensor pairs. The emitter/sensor pairs, used for data collection, are positioned in one or more planes aligned perpendicular to the path of the ball's travel. A plane herein is defined as emitter/sensor pairs configured so that the path associated with each of the pairs are located on a geometric plane. An array is defined at the emitter/sensor pairs, located on a plane, and aligned in one direction only, such as vertically or horizontally. A matrix is defined as both a vertical and horizontal arrays of emitter/sensor pairs.

The spacing between emitter/sensor pairs is based on the unique use of a communication sampling theorem and requires that at least two sensor paths be broken by a minimum diameter ball. When two or more planes are used, the distance between planes is established by a counter clock rate and the desired accuracy for the inter-plane speed value. Each emitter drive signal is modulated at a cyclical rate and the sensors high gain amplifier is band-pass filtered to provide separation of the desired signals from ambient interference.

A microprocessor or computer system is to be used to derive all of the calculated values from the collected sensor data. Positional data is calculated to less than one-tenth inch resolution within the active area of each array. Speed is calculated by two different methods and the one determined to be most accurate for all conditions is the value displayed.

A display system completes the processing of positional and speed values to meaningful information and displays the results. The display provides, as a minimum, horizonal and vertical position of the ball relative to the plate area, indicates ball or strike and speed of ball. As a minimum, inputs for upper and lower strike zone adjustments will also be provided for making the ball/strike decision. Additional information such as statistics of performance and ball movement in the plate area will also be provided on some models. The display may either be a custom design or, by using an interface, a computer system.

The system is portable and therefore may be moved to accommodate training at various locations. This is only possible by the rejection of ambient interference.

The technical advance represented by the invention as well as the objects thereof will become apparent from the following description of a preferred embodiment of the invention when considered in conjunction with the accompanying drawings, and the novel features set forth in the appended claims.

DESCRIPTION OF A PREFERRED EMBODIMENT

Figure 1:
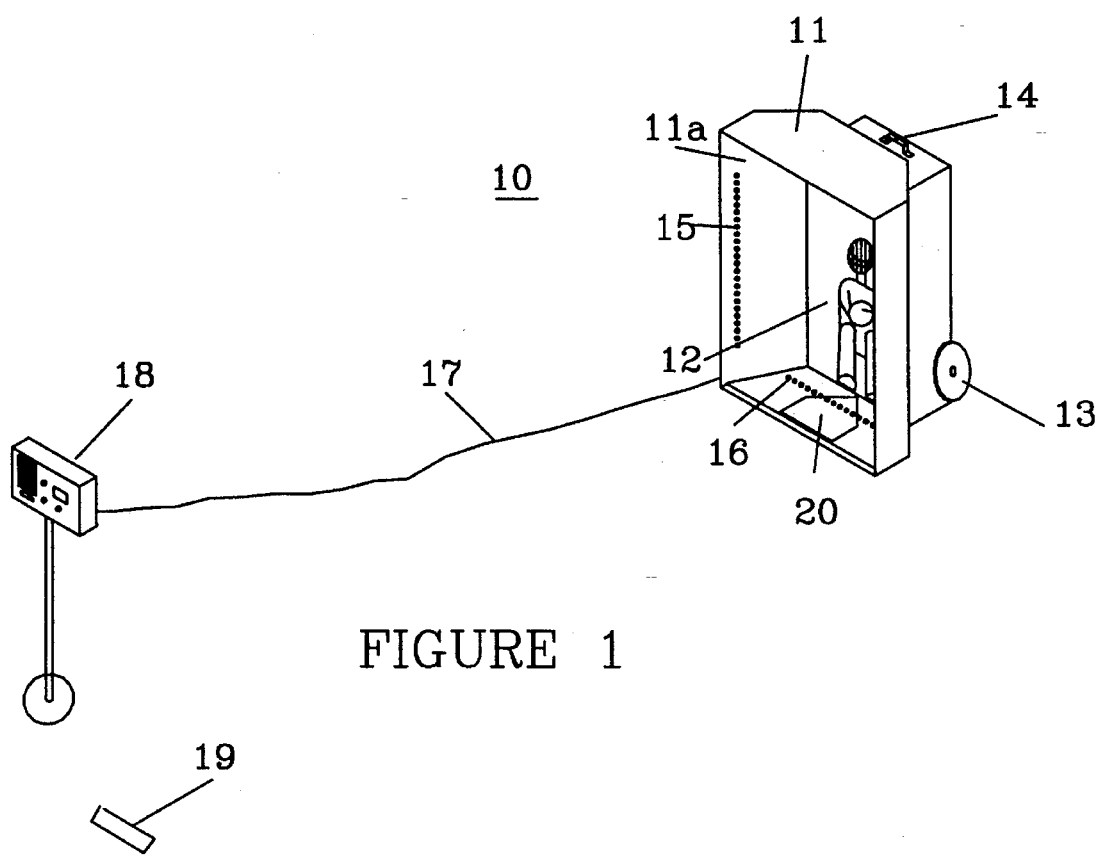
FIG. 1 illustrates a portable system according to the present invention.

An embodiment of the invention, shown in FIG. 1, includes a pitch collection box 10 which holds the emitter/sensor pairs, sensor band-pass filter amplifiers, main control board, associated cables and power supplies. The pitch collection box is connected to the display head 18 by the cable 17.

Housing 11 has sloped sides 11a that help direct the ball into the deceleration area 12 of housing 11, which stops the ball. A home plate area 20 is defined in the bottom of the box and is aligned with the defined sides of the strike zone. Pitch collection box 10 includes wheels 13 and a handle 14 for moving pitch collection box to and from a location and to aid in storing while not in use.

There are sensors 15 located at the side and top of housing 11. Emitters 16 are at one side opposite the sensors 15 and at the bottom of housing 11. The emitters are infrared LEDs, for example IR Diodes such as MLED91. The sensors are infrared sensors, for example IR Diodes such as MRD821. Baffles or channels are provided to prevent interference from adjacent pairs.

Figure 2A:
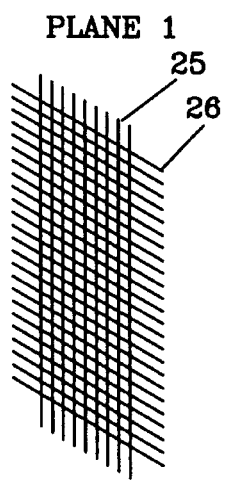
FIGS. 2a, 2b and 2c illustrate emitter/sensor configurations which can be used with the present invention.
Figure 2B:
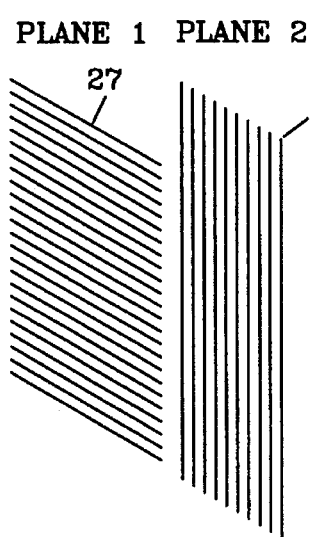
Figure 2C:
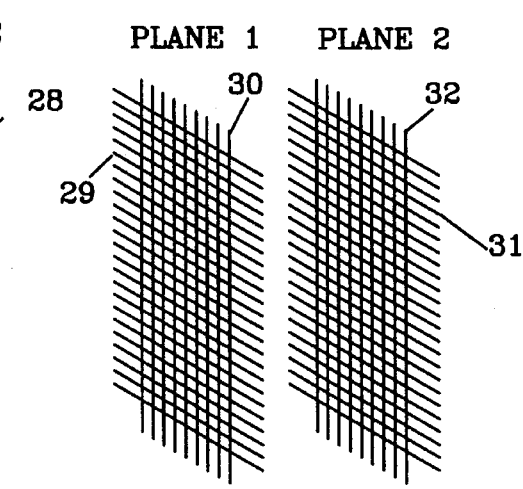

The emitter/sensor pairs arrangement indicated in FIG. 1 is shown in FIG. 2b, but may be arranged as illustrated in FIGS. 2a, 2b or 2c.

In FIG. 2a, two arrays are positioned in a common plane. Array 25 provides a plane from top to bottom of housing 11 and Array 26 provides a plane from side to side of housing 11.

In FIG. 2b, Array 27 and Array 28 are horizontally displaced, in two separate planes. Either of the arrays may be located so the ball breaks that plane first. The inter-plane displacement provides a more accurate method of speed calculation than a single plane.

In FIG. 2c, there are four emitter/sensor arrays, 29, 30, 31 and 32. Arrays 29 and 30 are positioned in a common plane and arrays 31 and 32 are positioned in a separate common plane. The inter-plane displacement provides a more accurate method of speed calculation than a single plane.

Figure 3:
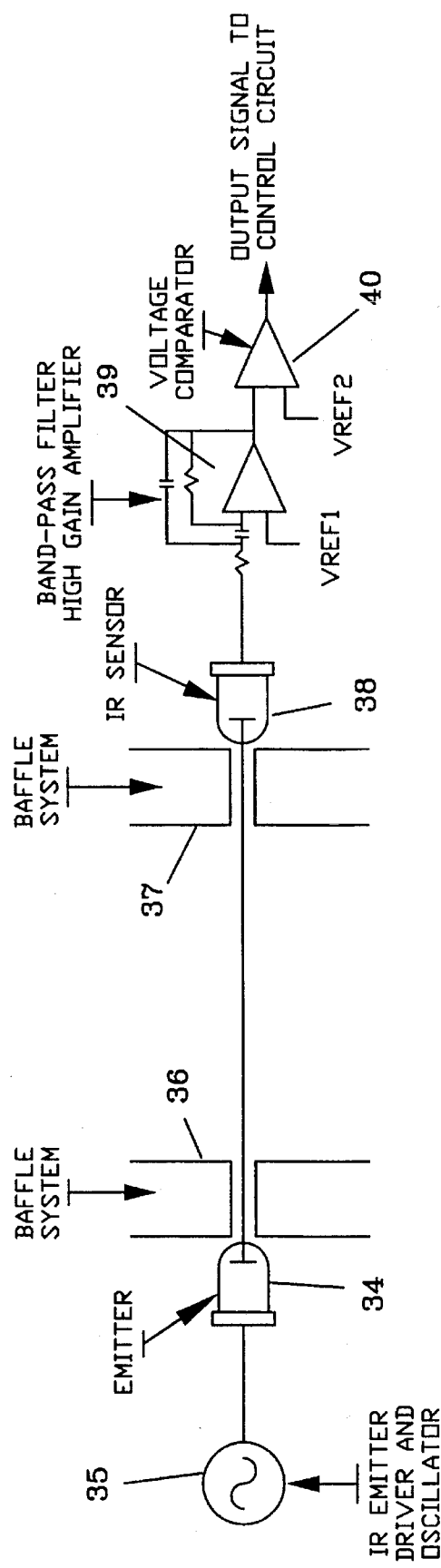
FIG. 3 shows signal generation and processing through a single emitter/sensor pair.

FIG. 3 shows a single emitter/sensor pair and the associated circuitry. An IR emitter 34 is shown being intensity modulated by an oscillator and driver 35. The light from emitter 34 passes through baffles 36 and 37 and impinges on IR sensor 38. The signal generated in IR sensor 38 passes through a band-pass filter/amplifier 39 to a voltage comparator 40. The resultant output signal is a recovered clock signal which is present when the path is not blocked by a ball and absent when blocked by a ball.

Figure 5:
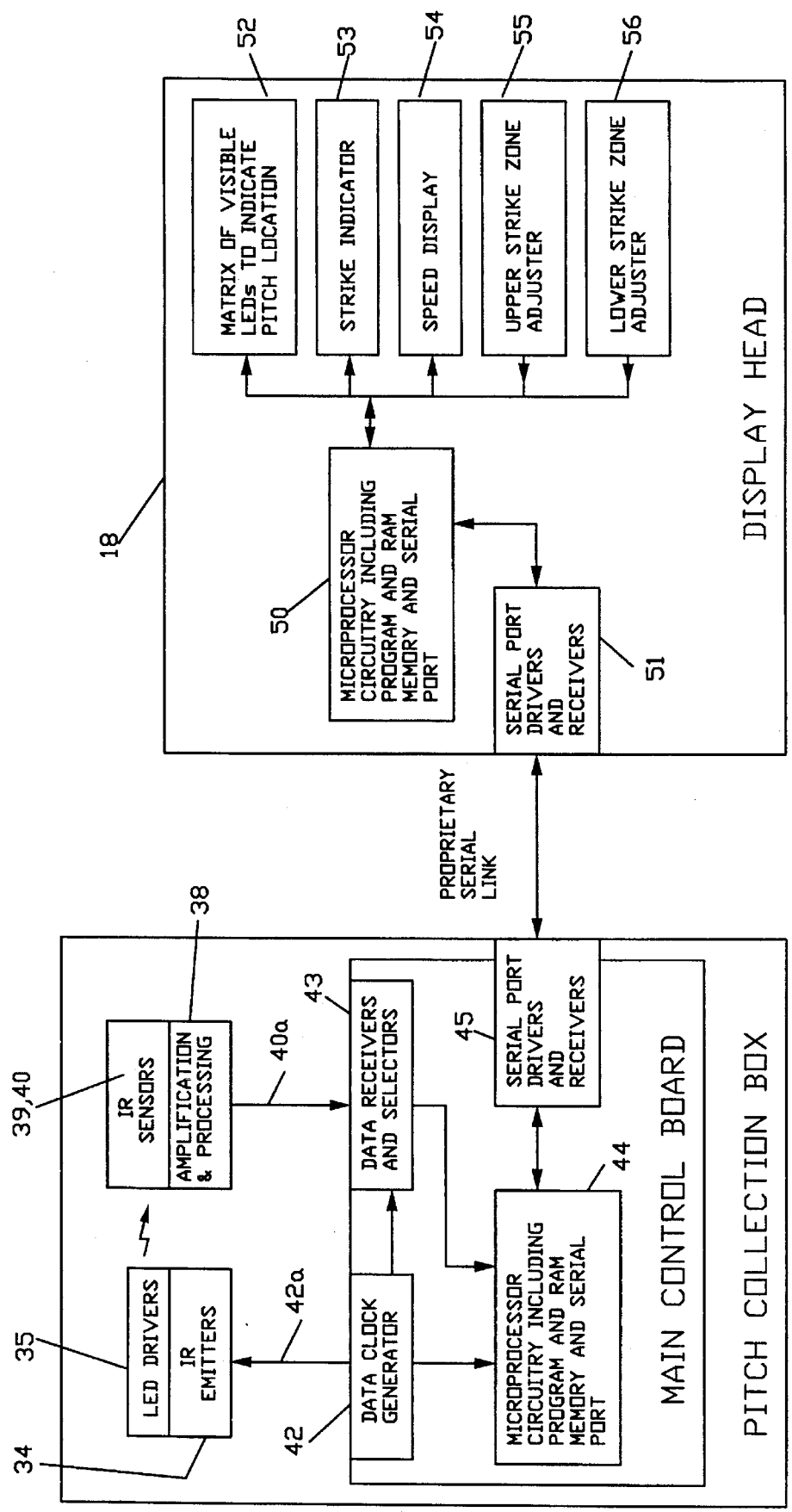
FIG. 5 is a block diagram of an apparatus electronics with a display head.

FIG. 5 shows a functional block diagram of a Main Control board, located in housing 11, and a display head 18, shown in FIG. 1.

Data Clock Generator circuit 42 is located on the Main Control Board which cyclically modulates the IR LEDs 34 through LED current drivers 35. The LED drivers and the control board are connected by cables 42a. Each cable contains two out of phase clock signals which are connected so that adjacent IR LEDs are always modulated out of phase to each other.

Before a sensor path is broken, all data received in Application and Processing 39,40 is equal to the logic level zero at valid sample times. When a sensor path is broken, one or more level. l's is recognized and these signals are clocked into the random access memory 43 (RAM), configured as first-in-first-out (FIFO), by the Data Clock Generator 42. The storing of all sensor data bits continues until after at least one complete scan of the sensors with all sensor data bits equal to zero, which indicates no blocked paths. The sum of l's stored in memory, for each sensor path, represents the period of time that the sensor path was interrupted by the projectile, called the Missing Count (MC) for the applicable sensor path, which is a function of the frequency (FO) data clock 42, the speed of the ball (SP, the radius of the ball (PAD), and the offset of the sensor path (OFF) from the center line of the ball. Microprocessor 44 processes the data out of the FIFO to generate position and speed values.

Data from the microprocessor 44 is serially sent through serial drivers 45 to the display head 18 for further refinement and presentation. Display head 18 includes a microprocessor 50 that receives the information from the Pitch Collection Box via serial receivers 51 and converts it into presentation format as well as making a ball/strike decision. A matrix of LEDs 52 show the relative location of the ball to the home plate area. Other indicators show if the ball is a strike 53 and display the most accurate ball speed 54. Inputs are provided to adjust the upper and lower strike zone levels 55 and 56 used in the strike/ball decision.

A computer system can be used to replace the representative display head 18. An interface board would be provided between the Pitch Collection Box and the display computer system in this configuration.

Calculations in the system described above begin with recognizing the ball is a symmetrical object and that Nyquist theorem applies. Therefore, when the counts from a minimum of two interrupted emitter/sensor paths have been accumulated, as the ball passes through the array, all information required to determine position and speed has been obtained. From this theorem, spacing between emitter/sensor pairs must be set equal to or less than one-half the minimum diameter of the ball minus the sensor diameters. This configuration also allows speed to be calculated as the ball passes through one array only.

Figure 4:
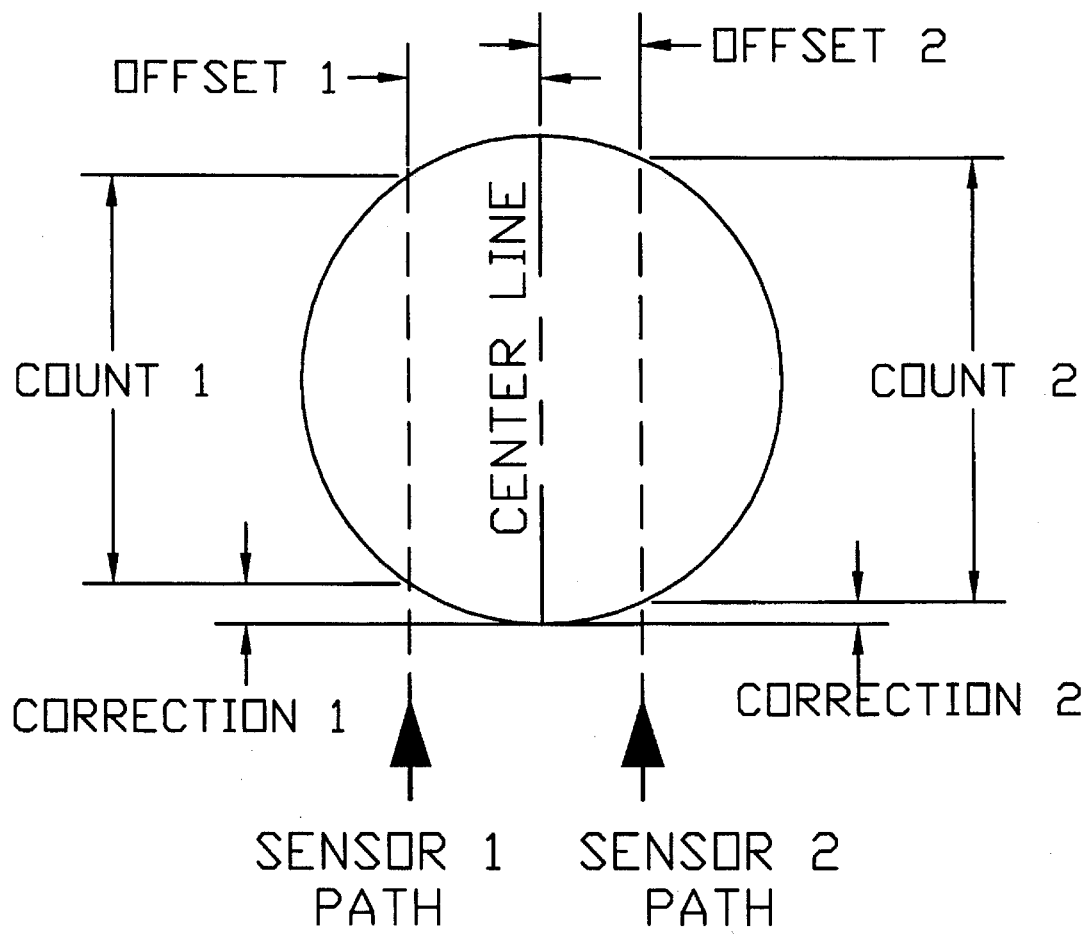
FIG. 4 illustrates a ball traveling through two sensor paths and the relationship of computed values.

FIG. 4 represents a ball as it passes through an array of emitter/sensor paths. FIG. 4 indicates two sensor paths have been interrupted by the ball and shows an accumulated count of missing received data, Count 1 and Count 2, for the respective sensor path. Each missing count is a function of data clock frequency, speed of the ball, radius of the ball and the offset of the sensor path from the Center Line, per the following equation;

$$MC = 2 * (FO/SP) * \sqrt{RAD^2 - OFF^2}$$

Where:

MC=Missing count accumulated for the sensor path,

FO=Data clock frequency (in hertz),

SP=Speed of the ball (in inches per second),

RAD=Radius of the ball (in inches),

OFF=Offset of the sensor path to the Center Line (in inches).

For each single count, the equation of this function has two unknowns. Since there are at least two separate equations, one for each path blocked and the associated count accumulated, and since the speed is constant between the equations, and the offset of one sensor path from Center Line is the fixed inter-sensor spacing minus the offset of the other sensor path from the Center line, the two equations are solved to produce offsets and speed.

In the operation of the system of FIG. 5, utilizing a matrix of two led arrays in a single plane, such as illustrated in FIG. 2a, a symmetrical projectile is moved through the led matrix so that the projectile will intersect two senor paths as illustrated in FIG. 4. For example, the projectile will actually intersect two sensor paths, of each array 25 and 26 in FIG. 2B, resulting in a total of four sensors paths being intersected, two in each array.

One method of calculating the offset, within each array, would be to use the ratio of the missing counts (MC2 and MC1) to obtain the equation:

$$\frac{MC2}{MC1} = \frac{2 * (FO/SP2) * \sqrt{RAD^2 - (SS - OFF1)^2}}{2 * (FO/SP1) * \sqrt{RAD^2 - (OFF1)^2}}$$

Where:

MCl=Missing count for path accumulating the maximum count;

MC2=Missing count for path accumulating the next to maximum count;
FO=Data clock frequency (in hertz);
OFFS=Offset of Center Line to the sensor path for maximum count (in inches);
SS=Inter-sensor spacing value (in inches);
RAD=Radius of the projectile (in inches); and
SP1=SP2=Speed is constant in these calculations (in inches per second).

When MCI=MC2, the center of the projectile is centered between the two applicable sensor pathes and the offset is one-half the inter sensor spacing. If the counts are not equal, the above equation can be solved and reduced to give the solution for OFF1 as follows:

$$OFF1 = \frac{(b^2*c) - \sqrt{(a^4*d^2) - (2*a^2*b^2*d^2) + (a^2*b^2*c^2) + (b^4*d^2)}}{(b^2 - a^2)}$$

Where:
MC1=b=Missing count for path accumulating the maximum count,
MC2=a=Missing count for path accumulating the next to maximum count,
OFF1=Offset of Center Line to the sensor path for maximum count (in inches),
SS=c=Inter-sensor spacing value (in inches), and
RAD=d=Radius of the projectile.

Once the offset is derived, the equation for the path accumulating the maximum count can be reconfigured to provide speed as follows:

$$SP = 2 * (FO/MCI) * \sqrt{RAD^2 - OFF1^2}$$

Where:
MCI=Missing count for path accumulating the maximum count;
FO=Data clock frequency (in hertz);
OFF1=Offset of Center Line to the sensor path for maximum count (in inches);
RAD=Radius of the projectile; and
SP=Speed calculated for the array (in inches per second).

In FIG. 4 corrections, Correction 1 and Correction 2, are shown which represent the distance the leading edge of the ball has penetrated the plane before the first missing data is encountered for that sensor path. These values are the unique method used in this invention to correct inter-plane calculations. One method of deriving this value, for a particular sensor path, is to calculate the equivalent count of the Center Line, subtract the sensor path's actual missing count, and then divide this value in half. The equation for this inter-plane correction count, using the maximum count (MCI) is as follows:

$$COR1=((2*(FO/SP)*RED)-MC1)/2$$

Where:
COR1=Correction count for the inter-plane count;
MCI=Missing count for path accumulating the maximum count;
FO=Data clock frequency (in hertz);
RAD=Radius of the projectile; and
SP=Speed calculated above (in inches per second).

For systems using two or more planes as indicated by FIGS. 2b and 2c, a more accurate speed value can be derived by starting a clock counter as the ball enters a known position relative to the first plane and stopping the clock when the ball enters a known position relative to the second plane. For each plane crossed by the ball, one of the correction values, Correction 1 or Correction 2 in FIG. 4, is used to correct this inter-plane count for a very accurate speed calculation per the following formula:

$$SPIP=(F1* IPS*K)/IPCC$$

Where:
SPIP=Speed value for inter-plane count (in MPH),
F1=Inter-plane counter clock frequency (in hertz),
IPCC=Inter-plane count corrected for each plane,
IPS=Inter-plane space (in inches),
K=Constant to convert from inches per second to miles per hour.

If the inter-plane clock is different from the data clock the correction counts must be adjusted accordingly before used to correct the inter-plane count.

All calculations indicated above may be either performed at the time of use or may be used to derived value tables stored in the microprocessor or computer programs for look-up at the time of use.

The apparatus of the invention is adaptable to any other type of symmetrical ball, such as a softballs and volleyballs.

What is claimed:

1. An apparatus for determining, as a minimum, the position and speed of a spherical projectile passing through an emitter/sensor matrix constructed in a single plane, comprising of:

a plurality of emitter/sensor pairs, constructed as a matrix in a single plane for producing signals dependent on projectile speed and the vertical and horizontal positions of the projectile as it passes through the matrix of emitter/sensor pairs, a cyclical clock circuit for intensity modulating light produced by said emitters, and sensor processing circuits, including a band-pass filter for separating the intensity modulated light signals from ambient light and interference, a processor for receiving data signals representative of the intensity modulated light received by the light sensors for calculating a projectile speed value when a minimum of two sensors paths, in either array of said matrix, have been blocked as the projectile passes through the matrix and for processing the data signals to calculate projectile horizonal and vertical positions when a minimum of two sensor paths, in each array of said matrix, have been blocked as the projectile passes though the array; and a display system remotely located from said collection box for displaying performance and statistical information about a single or collection of projectiles passing through the matrix.

2. The apparatus according to claim 1, wherein cyclically modulated light signals of adjacent emitters in said array are cycled out of phase to reduce interference and power requirements.

3. The apparatus according to claim 1, wherein the light signals are generated by infrared LEDs, and the sensors are infrared photo diodes.

4. The apparatus according to claim 1, wherein the inter-sensors spacing is one-half the minimum diameter of the spherical projectile minus the diameter of the sensors.

5. The apparatus according to claim 1, wherein lower and upper strike zone levels are adjustable inputs for making ball/strike decisions.

6. An apparatus for determining, as a minimum, the position and speed of a spherical projectile as it passes through an emitter/sensor matrix constructed with at least two separated planes, comprising:

- at least two separated arrays of a plurality of emitter/sensor pairs, constructed as a matrix, for producing signals dependent on projectile speed and the vertical and horizontal position of the projectile as it passes through the matrix;
- a clock circuit for producing a cyclically intensity modulated light signal;
- a signal process circuit for each sensor, including a band-pass filter, for receiving said modulated light signal; and
- a processor for receiving data signals representative of the intensity modulated light received by the light sensors for calculating a projectile speed value when a minimum of two sensors paths in either array of said matrix have been blocked as the projectile passes through the matrix, and for processing the data signals to calculate projectile horizonal and vertical positions, the speed, and offset of the projectile center from the sensor paths for each blocked path determined by using the following relationship:

$$MC = 2 * (FO/SP) * \sqrt{RAD^2 - OFF^2}$$

Where:
MC=Missing data count as the projectile blocks the sensor path,
FO=Data sample frequency,
SP=Speed of the projectile,
RAD=Radius of the projectile,
OFF=Offset of the projectile center from the sensor path;
wherein an inter-plane processor calculates inter-plane speed by dividing a system derived constant by a corrected inter-plane count, in which the count has been corrected for the penetration of the projectile into each plane by a count equal to one-half the difference of a count calculated by the above equation with an offset equal to zero and an MC, missing data count, for that plane; and
an display system, remotely located from said collection box for displaying performance and statistical information about a single or collection of projectiles passing through the matrix.

7. The apparatus according to claim 6, wherein light signals of adjacent emitters in said array are modulated out of phase to reduce interference and power.

8. The apparatus according to claim 6, wherein the light signals are generated by infrared LEDs, and the sensors are infrared IR photo diodes.

9. The apparatus according to claim 6, wherein the inter-emitter/sensor spacing is one-half the minimum diameter of the spherical projectile minus the diameter of the sensors.

10. The apparatus according to claim 6, wherein inter-plane minimum spacing is determined by an inter-plane counter clock rate and speed accuracy requirements.

11. The apparatus according to claim 6, wherein lower and upper strike zone levels are adjustable inputs for making ball/strike decisions.

12. An apparatus for determining, as a minimum, the position and speed of a spherical projectile passing through two or more physically separated matrices, comprising of:

- a plurality of emitter/sensor pairs, constructed as multiple matrices in multiple planes for producing data signals dependent on projectile speed and the vertical and horizontal positions of the projectile as it passes through the matrices;
- a cyclical clock circuit for intensity modulating light produced by said emitters, and sensor processing circuits, including a band-pass filter for separating the intensity modulated light signals from ambient light and interference;
- a processor for receiving data signals representative of the intensity modulated light received by the light sensors for calculating a projectile speed value when a minimum of two sensor paths in either array of said matrix have been blocked as the ball passes through a matrix, and for processing the data signals to calculate, using the following relationship, projectile horizonal and vertical positions, the speed, and offset of the projectile center from the sensor path, for each blocked path:

$$MC = 2 * (FO/SP) * \sqrt{RAD^2 - OFF^2}$$

Where:
MC=Missing data count as the projectile blocks the sensor path,
FO=Data sample frequency,
SP=Speed of the projectile,
RAD=Radius of the projectile,
OFF=Offset of the projectile center from the sensor path;
wherein an inter-plane processor calculates inter-plane speed by dividing a system derived constant by a corrected inter-plane count, in which the count has been corrected for the penetration of the projectile into each plane by a count equal to one-half the difference of a count calculated by the above equation with an offset equal to zero and an MC, missing data count, for that plane; and
a display system, remotely located from said collection box for displaying performance and statistical information about a single and/or collection of projectiles passing through the matrices.

13. The apparatus according to claim 12, wherein cyclically modulated light signals of adjacent emitters in said array are cycled out of phase to reduce interference and power requirements.

14. The apparatus according to claim 12, wherein the light signals are generated by infrared LEDs and the sensors are infrared photo diodes.

15. The apparatus according to claim 12, wherein the inter-emitter/sensor spacing is one-half the minimum diameter of the spherical projectile minus the diameter of the sensors.

16. The apparatus according to claim 12, wherein inter-sensors spacing is one-half the minimum diameter of a speherical projectile minus the diameter of the sensors.

17. The apparatus according 12, wherein lower and upper strike zone levels within the pitch collection box are adjustable inputs for making ball/strike decisions.

* * * * *